(12) United States Patent
Shibata et al.

(10) Patent No.: US 6,429,618 B2
(45) Date of Patent: Aug. 6, 2002

(54) INDEX SIGNAL GENERATOR

(75) Inventors: Akira Shibata, Murayama; Yoshihito Otomo, Yamagata, both of (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/750,926

(22) Filed: Dec. 28, 2000

(30) Foreign Application Priority Data

Dec. 28, 1999 (JP) ............................................. 11-374984

(51) Int. Cl.⁷ ............................................... G05B 11/01
(52) U.S. Cl. ....................... 318/560; 318/603; 318/601; 360/70
(58) Field of Search ................................ 318/600–610, 318/560, 139, 256, 439; 360/72.1, 70, 73.01, 72.2, 722; 369/47, 78.06; 324/208, 102, 174

(56) References Cited

U.S. PATENT DOCUMENTS 4,831,468 A * 5/1989 Nishioka
4,882,511 A   11/1989 Von der Heide
4,978,902 A * 12/1990 Hatagami et al.
5,050,013 A *  9/1991 Holsinger

FOREIGN PATENT DOCUMENTS

JP           9-91859        4/1997

* cited by examiner

Primary Examiner—Robert E. Nappi
Assistant Examiner—Edgardo San Martin
(74) Attorney, Agent, or Firm—Frishauf, Holtz, Goodman & Chick, P.C.

(57) ABSTRACT

The index signal generator generates an original signal every the rotor of the direct-drive motor rotates, and delays the original signal by a delay time to produce index signal. The index signal generator comprises, as the delay giving the delay time, the delay counter that can be set the initial value, instead of an analog delay circuit, a variable register and a capacitor. The delay counter comprises the counter and the counter value selector for determining the initial value of the counter. The counter starts to count the clock signals generated by the clock in response to the original signal, and stops counting the clock signals and generates the index signal when the number of the clock signals counted by the counter reaches the initial value.

8 Claims, 13 Drawing Sheets

INDEX SIGNAL GENERATOR

BACKGROUND OF THE INVENTION

This invention relates to an index signal generator which generates an index signal. The index signal generator is used for a disk drive that handles a recordable medium, and provides the disk drive with hardware compatibility for the same kind of disk drives. For example, a recordable medium is a floppy disk (FD) and a disk drive is a floppy disk drive (FDD).

As well known, FDDs are devices for reading data out of FDs and for writing data in FDs. FDDs have spread to the art of electronic devices and have been used in various electronic devices, for example, a personal computer, a work station, a word processor, and so forth.

One of the reasons why FDDs have widely applied to electronic devices is the data compatibility that users can move data from an electronic device with FDD to another electronic device with FDD by FD. That is, the high data compatibility among FDDs promotes the use of FDDs.

In general, the data compatibility among FDDs are ensured with the hardware compatibility, the standardized track format, and the software (or application) standards. Among them, the hardware compatibility standardizes a magnetic head, a posture of a magnetic head, a generation timing of an index signal and so on.

An index signal is a pulse signal that is generated every a magnetic disk included in an FD rotates in order to indicate a starting position of the disk rotating. The index signal is used for various uses in an FDD and a system of electronic device. For example, the index signal is used for generation of "Ready" signal in an FDD. Thus, the index signal is a great contribution to the hardware compatibility among FDDs.

In an FDD of 3.5 inch type, an FD is driven by a pin projecting from a disk table toward the FD so that the magnetic disk is rotated. In this case, the disk table and the rotor included in the FDD rotate together with the magnetic disk so that the rotation of the rotor and the disk table synchronizes with that of the magnetic disk.

An index signal is generated on the basis of a rotation of a rotor if a direct-drive motor is used to drive a disk rotation. For example, a direct-drive motor is a spindle motor.

To detect a rotor rotation, a small magnet is provided with the rotor, while "Hall element" is located close to the peripheral surface of the rotor. Hall element is a semiconductor element using a "Hall effect," the development of a transverse electric field in a current-carrying conductor placed in a magnetic field. Hall element serves as the current-carrying conductor. Ordinarily Hall element is positioned so that the magnetic field is perpendicular to the direction of current flow and the electric field is perpendicular to both. A voltage occurred at Hall element by Hall effect is called Hall voltage.

Especially, in an earlier FDD, only one pole of the small magnet is exposed to the outside of the rotor. With the structure, during the single rotation of the rotor, the exposed pole of the small magnet passes in front of the Hall element for once.

As the exposed pole of the small magnet approaches the Hall element, the magnetic flux detected by the Hall element increases. When the center of the exposed pole faces to the center of the Hall element, the detected magnetic flux become maximum. As the exposed pole gradually leaves the Hall element, the detected magnetic flux decreases. During these events, the Hall voltage changes in a half period of the sine curve with a certain coefficient. The index signal is generated at a time when a delay time passes since the Hall voltage reaches a predetermined level.

The delay time is set appropriately so that the hardware compatibility among FDDs is obtained. To set the delay time to the appropriate time, the earlier FDD comprises a delay or a delay circuit where a delay time can be varied. The delay time is adjusted after production of the earlier FDD so that the index signal generated in the earlier FDD can meet the hardware compatibility.

However, in the earlier FDD, the delay comprises a variable register and a capacitor, both of which are connected in parallel to each other, besides an analog delay circuit that is formed in an integrated circuit. The variable register and the capacitor make the cost of the earlier FDD high because these are discrete elements. In addition, the adjustment process of the variable register brings about some costs.

SUMMARY OF THE INVENTION

The present invention therefore provides an index signal generator comprising a delay without a variable register and a capacitor.

According to one aspect of the present invention, the index signal generator comprises, as the delay, the delay counter that can be set the initial value or the initial counter value. The index signal generator is for generating an index signal and is used to control the rotation of the rotor included in the direct-drive motor.

In detail, the index signal generator according to one aspect of the present invention comprises an original signal generator, a clock, a counter value selector and a counter. The original signal generator generates an original signal every the rotor rotates. The clock periodically generates a clock signal. The counter value selector has the first predetermined number of terminals and holds the second predetermined number of counter values. Terminals are given selection signals from outside of the index signal generator. Each selection signal has a selection value. The counter values are different from one to another. The counter value selector selects, as a selected counter value, one among the counter values in response to the combination of the selection values. The counter starts to count the clock signals generated by the clock in response to the original signal, and stops counting the clock signals and generates the index signal when the number of the clock signals counted by the counter reaches the selected counter value. The counter may be formed with the counter value selector.

DESCRIPTION OF THE PREFERRED EMBODIMENT

Figure 1:
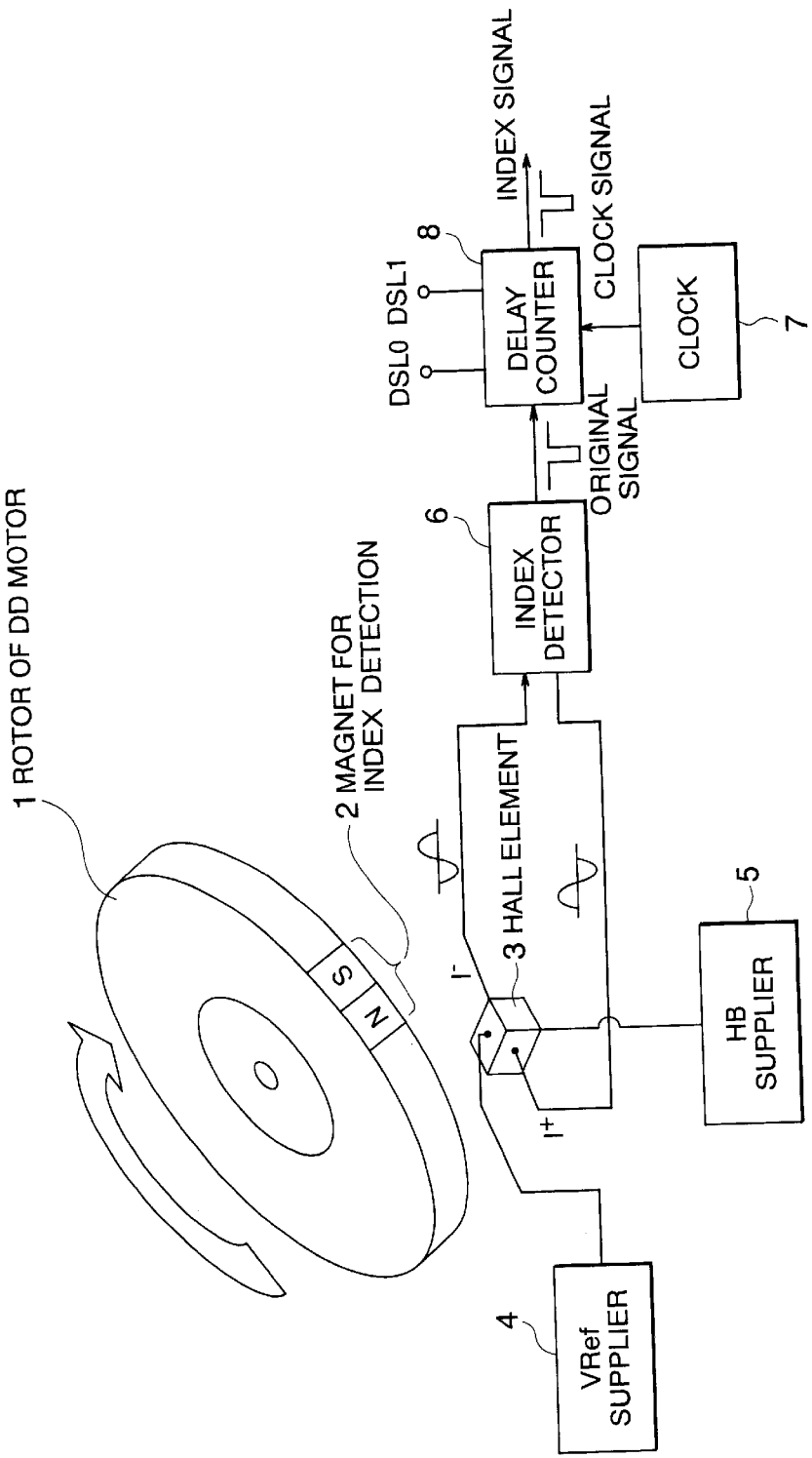
FIG. 1 is a diagram schematically showing the index signal generator according to one aspect of the present invention.

Referring to FIG. 1, the index signal generator according to one aspect of the present invention comprises the Hall element 3, the reference voltage supplier (VRef supplier) 4, the Hall bias supplier (HB supplier) 5, the index detector 6, the clock 7, the delay counter 8. The index signal generator is for generating an index signal every the rotor 1 of the direct-drive motor rotates.

The illustrated rotor 1 is in disk-shape with thickness and is provided with the magnet 2 for index detection on the peripheral surface of the rotor 1, as shown in FIG. 1. The magnet 2 is arranged to be exposed to the outside of the rotor 1, and has positive and negative poles which are arranged along a tangential direction of the disk-shape of the rotor 1.

The Hall element 3 is located at a predetermined position that is a position outside of the rotor. The predetermined position is determined in consideration of a detecting ability of the Hall element and magnetic force of the magnet so that the Hall element can detect the change of magnetic flux suitably. In this embodiment, the Hal element 3 is supplied with the outer electric field by the reference voltage supplier 4 and the Hall bias supplier 5, in order to produce the Hall voltage in accordance with Hall effect. For example, the voltage level supplied by the reference voltage supplier 4 is 2.5 V, while the other voltage level supplied by Hall bias supplier 5 is 1 V. In this case, the Hall element 3 is supplied with the outer voltage of 1.5 V.

Under the condition, when the rotor 1 rotates and the magnet 2 passes in front of the Hall element 3, the magnetic flux detected by the Hall element changes depending upon the passing magnet 2. As the result, Hall effect occurs at the Hall element 3. The Hall element 3 delivers to the index detector 6 the Hall voltage influenced by the occurring Hall effect.

As described above, the positive and negative poles of the magnet 2 are arranged along the tangential direction of the disk-shape of the rotor 1. This causes the Hall voltage, namely the change of the magnetic flux, to have the cross point to a boundary between a plus region and a minus region of the change of the magnetic flux when the poles of the magnet passing in front of the Hall element are changed from one to another.

Figure 2:
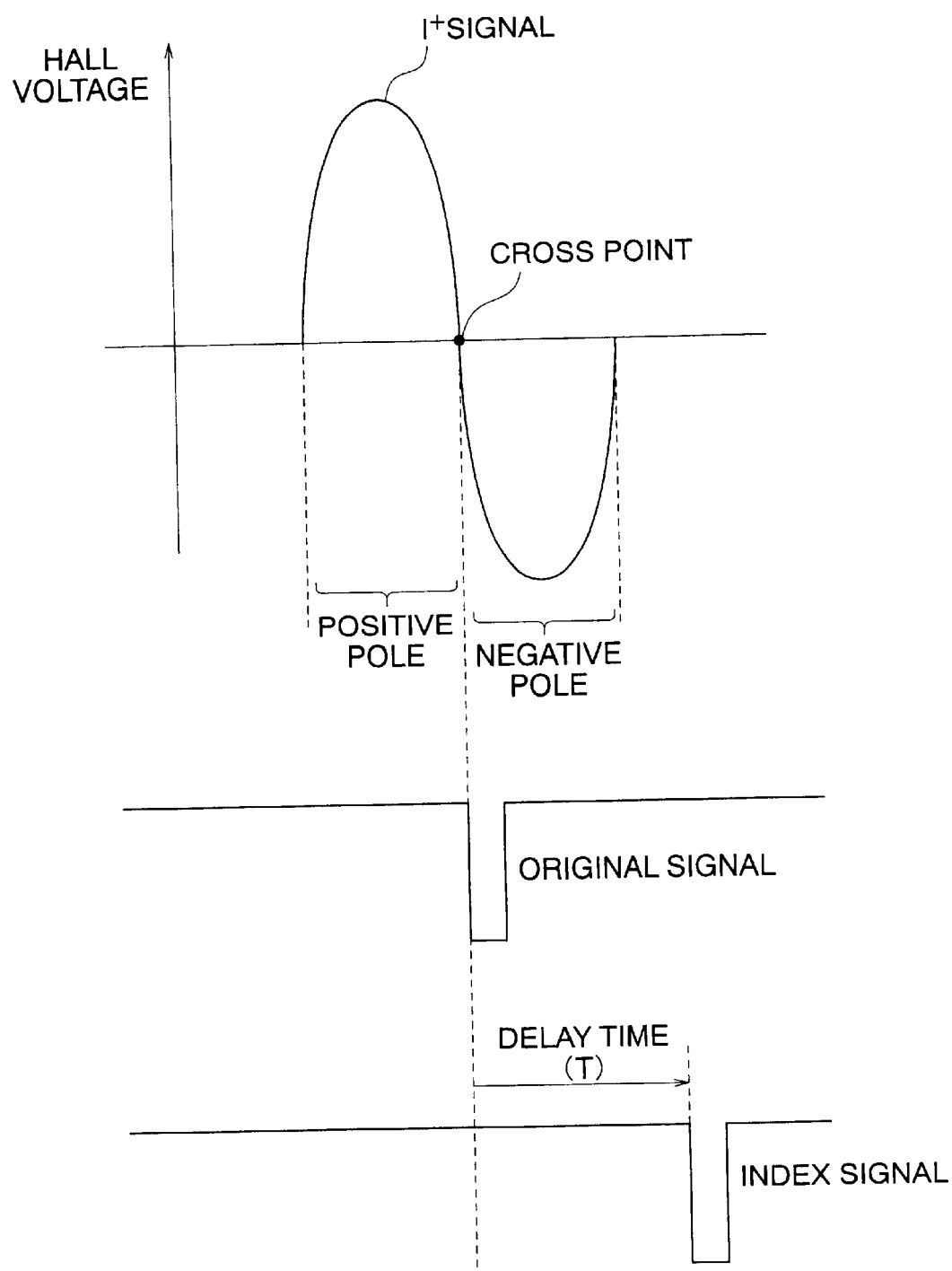
FIG. 2 is a graph showing the change of Hall voltage, the original signal and the index signal in the preferred embodiment of the present invention.

In this example, the magnet 2 is arranged so that the poles of the magnet passing in front of the Hall element are changed from the negative pole to the positive pole. As the negative pole of the magnet 2 approaches the Hall element 3, the magnetic flux detected by the Hall element 3 increases. When the center of the negative pole faces to the center of the Hall element 3, the detected magnetic flux become maximum. After that, the detected magnetic flux decreases. The change of the magnetic flux has the cross point (zero cross point) when the passing poles of the magnet 2 are changed from the negative pole to the positive pole. The magnetic flux decreases until the center of the positive pole faces to the center of the Hall element 3, and then the magnetic flux increases. As shown in FIG. 1, the Hall element 3 produces two types of the Hall voltage signals, one of which is non-reverse signal ($I^+$) while the remaining one of which is reverse signal ($I^-$). For the sake of clarity, former type ($I^+$) of the Hall voltage signal is shown in FIG. 2.

The index detector 6 of the embodiment monitors the Hall voltage signals $I^+$ and $I^-$. That is, the index detector 6 detects the change of magnetic flux that effects on the Hall element 3. The index detector 6 produces an original signal at the time when the cross point of the change of the magnetic flux is detected (see FIG. 2). The index detector 6 may comprise a comparator having positive and negative input terminals which are given the Hall voltage signals $I^+$ and $I^-$, respectively. In this case, the comparator of the index detector 6 outputs a low level pulse as the original signal at the moment when the Hall voltage signal $I^+$ is not larger than the other Hall voltage signal $I^-$.

In order to ensure the hardware compatibility, the original signal is delayed by the predetermined delay time, as mentioned above. To delay the original signal, the delay counter 8 and the clock 7 that periodically generates a clock signal are used in the index signal generator of this embodiment.

The delay counter 8 of this embodiment comprises a counter value selector and a counter. The counter value selector of this embodiment has two terminals DSL0 and DSL1, and holds counter values. Each terminal is supplied, from the outside of the index signal generator, a selection signal which has a selection value, for example, "High" or "Low." The counter values are different from one to another. The counter value selector can select, as a selected counter value, one among the counter values in response to a combination of the selection values.

The counter is given the selected counter value as its initial value and starts to count the clock signals input from the clock 7 in response to the original signal generated by the index detector 6. The counter stops counting the clock signals when the number of the clock signals counted reaches the selected counter value, namely the initial value, so as to generate the index signal. Thus, in the delay counter 8, the delay time corresponds to the number of the clock signals.

For example, the combinations of the selection values given to the terminals DSL0 and DSL1 are predetermined to correspond to the delay times, as shown in Table 1. The correspondence makes the adjusting cost of the delay time decrease because the delay time can be adjusted only by changing the selection values given to the terminals DSL0 and DSL1.

TABLE 1

| DSL0 | High | | Low | |
|---|---|---|---|---|
| DSL1 | High | Low | High | Low |
| Delay Time [ms] | $T_1$ | $T_2$ | $T_3$ | $T_4$ |

The person skilled in the art can employ various techniques already known, in order to give the selection values to the terminals DSL0 and DSL1. For example, how to give the selection values may be to short or to open the terminals DSL0, DSL1 and the base voltage, especially, by means of the soldering, the jumper pins, or the like. Also, it may be employed to connect the terminals DSL0, DSL1 with either the power supply line or the ground line by means of the jumper pins.

Figure 3:
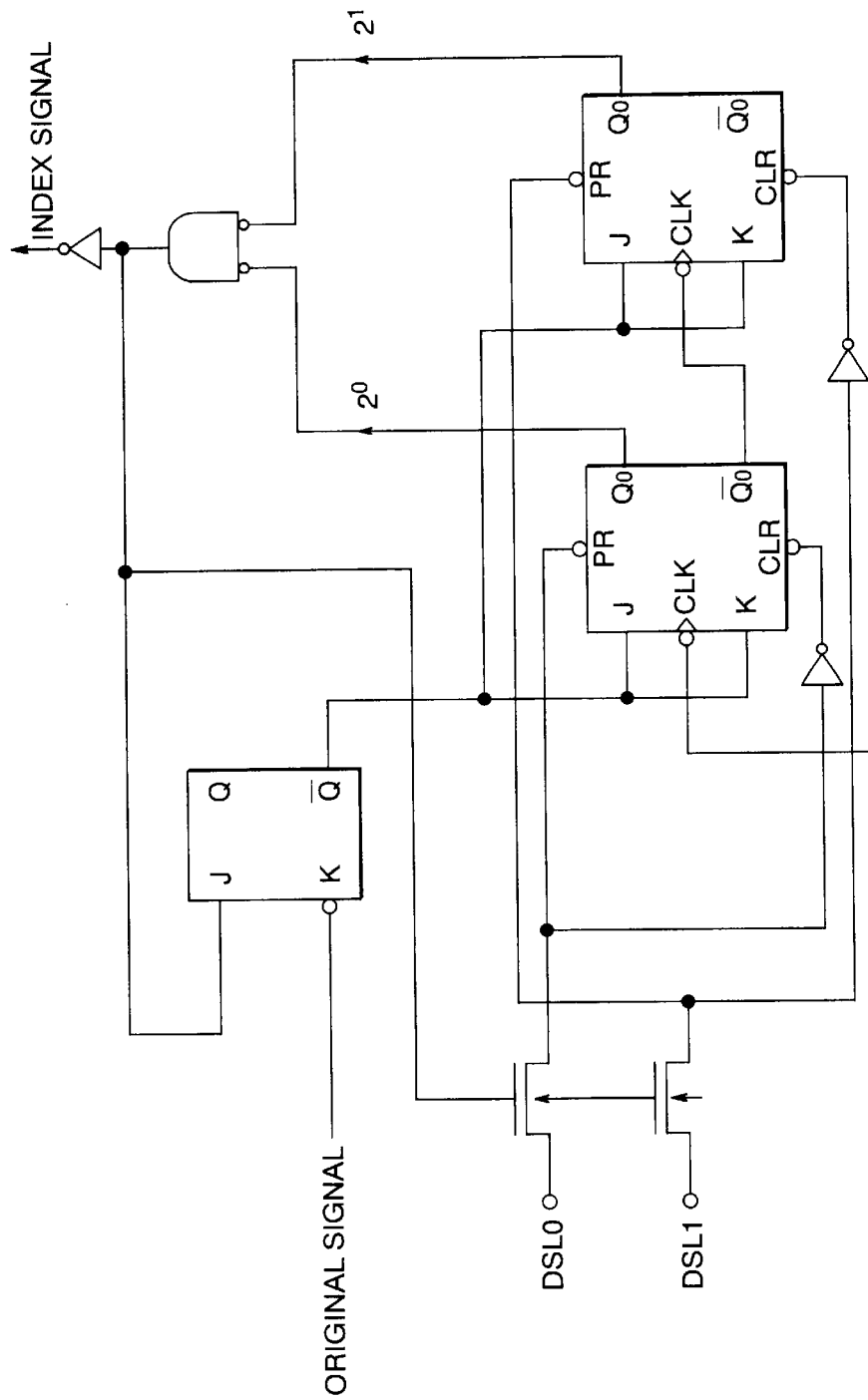
FIG. 3 is an example of the delay counter shown in FIG. 1.

Referring to FIG. 3, one example of the delay counter 8 with terminals DSL0 and DSL1 is an asynchronous decremental counter. The asynchronous decremental counter of the delay counter 8 comprises a simple JK-FF and two JK-FFs which have preset terminals (PR) and clear terminals (CLR) and which can be set initial values to. The clear terminals are also called reset terminals (R). The illustrated nMOS transistors serve as "switches." The terminals DSL0, DSL1 are connected to the preset terminals and the clear terminals through the nMOS transistors. Also, inverters are arranged between the nMOS transistors and the clear terminals.

With the above-mentioned structure, the initial value can be set into the JK-FFs having the preset and the clear terminals, according to the selection values given to the terminals DSL0 and DSL1, when the nMOS transistors turn on. The nMOS transistors turn on when all of the outputs of the JK-FFs having PR terminals are zero. That is, when the asynchronous decremental counter of the delay counter 8 generates the index signal, the nMOS transistors turn on. In other case, the nMOS transistors always turn off. The illustrated simple JK-FF outputs "High" level when the original signal of "Low" level signal is input into the simple JK-FF, and then keeps outputting the "High" level. The simple JK-FF outputs "Low" level when all of the outputs of the JK-FFs having PR terminals are zero.

Figure 4:
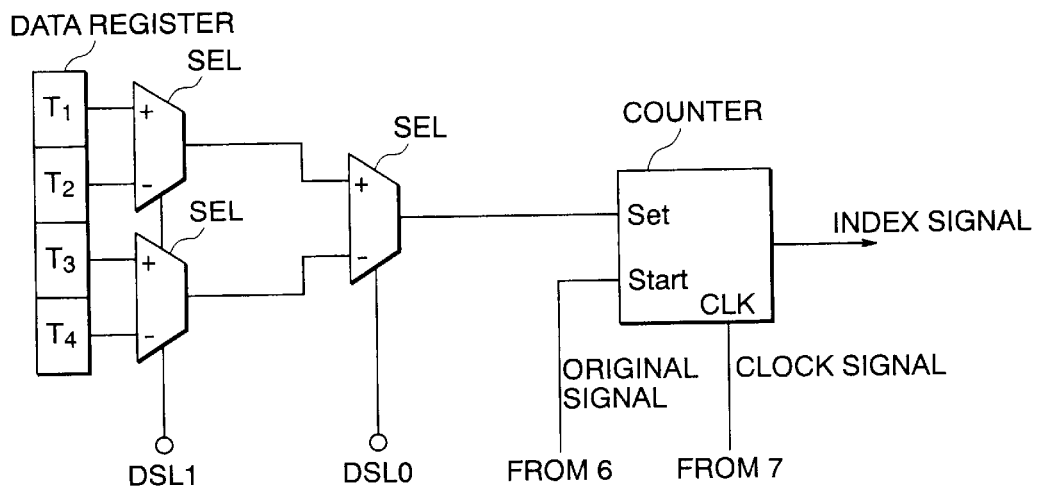
FIG. 4 is another example of the delay counter shown in FIG. 1.
Figure 5:
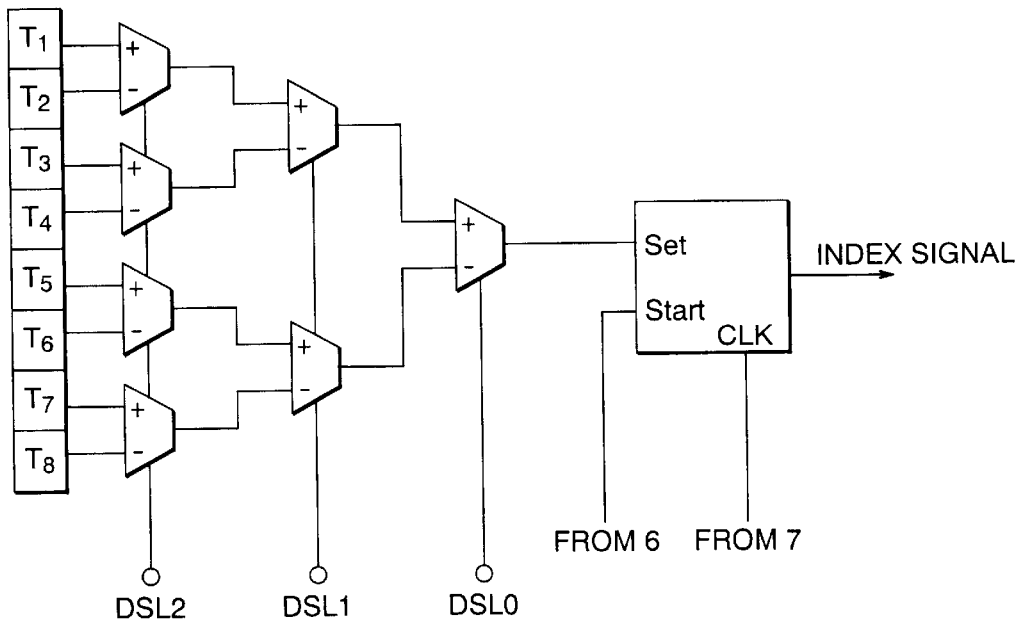
FIG. 5 is yet another example of the delay counter shown in FIG. 1.

Referring to FIG. 4, another example of the delay counter 8 with terminals DSL0 and DSL1 comprises four data registers, three selectors and a decremental counter. The data registers hold counter values of $T_1$, $T_2$, $T_3$, and $T_4$, respectively. Two selectors directly connected to the data resisters is referred to as first-stage selectors, while the other one selector is referred to as a second-stage selector. The first-stage selectors select data in response to the selection value, "High" or "Low," given to the terminal DSL1. The second-stage selector selects a datum in response to the selection value, "High" or "Low," given to the terminal DSL0. Thus the combination of the selection values given to the terminals DSL0 and DSL1 causes the selectors to select one among the counter values, $T_1$, $T_2$, $T_3$, and $T_4$. The selected counter value is set into the setting terminal (SET) of the decremental counter, so as to be the initial counter value of the decremental counter. The decremental counter starts to count the clock signals generated by the clock 7 when the index detector 6 generates the original signal, and decreases a value of the decremental counter by one every counting the clock signals. When the decrement makes the counter value zero, the decremental counter stops counting the clock signal so as to outputs the index signal.

More terminals makes the number of the combinations of the selection values increase. For example, if the number of the terminals is three, the number of the combinations may be eight. In this case, eight data registers, four first-stage selectors, two second-stage selectors, a third-stage selector and a decremental selector comprise the delay counter 8.

Now, description will be made about a concrete example of the above-mentioned embodiment but will not give any restriction on the present invention. In the following description, the index signal generator is included in the FDD of the concrete example.

The floppy disk drive of this example comprises a magnetic head, a carriage assembly, a stepping motor and a spindle motor. The magnetic head is for reading data out of the magnetic recordable medium of FD and for writing data in the magnetic recordable medium. The carriage assembly supports the magnetic head at a tip of the carriage assembly so that the magnetic head can travel along a radial direction of FD. The stepping motor can move the carriage assembly along the radial direction. The spindle motor is one of direct-drive motors and can rotate the magnetic recordable medium with FD being held.

Various FDD controllers or FDD control apparatuses have been already proposed to control the FDD. Almost all the FDD controllers already proposed can employ the index signal generator according to the preferred embodiment of the present invention.

FD driven by FDD includes a disk-shaped magnetic recordable medium accessed by the magnetic head. The magnetic recordable medium has tracks on a surface thereof. The tracks are formed in concentric circles and serve as paths for recording data. Compliant with standards, FD has eighty tracks on one side, which include the most outer circumference track (which is named "TR00") and the most inner circumference track (which is named "TR79"). The most outer circumference track TR00 is herein called the most end track.

In order for the magnetic head to access to FD, the magnetic head must be positioned at a desired track position. Accordingly, the carriage assembly, supporting the magnetic head at the tip thereof, must be positioned, too. Since the stepping motor is used as a driving arrangement for driving the carriage assembly, FDD can easily carry out the positioning of the carriage assembly.

FDD has only to detect the position of the most end track TR00 in the magnetic recordable medium of the FD loaded in the FDD. For the position detection of the most end track TR00, the carriage assembly is provided with an interception plate. The interception plate downwardly projects from a base section of the carriage assembly. In addition, a photo-interrupter is mounted on the substrate arranged close to the main frame, which is located on opposite side to the carriage assembly. With the structure, the interception plate intercepts an optical path in the photo-interrupter when the magnetic head is laid on the most end track TR00 in the magnetic recordable medium of the FD, so that the position of the most end track TR00 can be detected. The track position detection mechanism is called a "00 sensor." A similar device is disclosed in Japanese Unexamined Patent Publication Tokkai No. Hei 9-91,859 or JP-A 9-91859.

Figure 6:
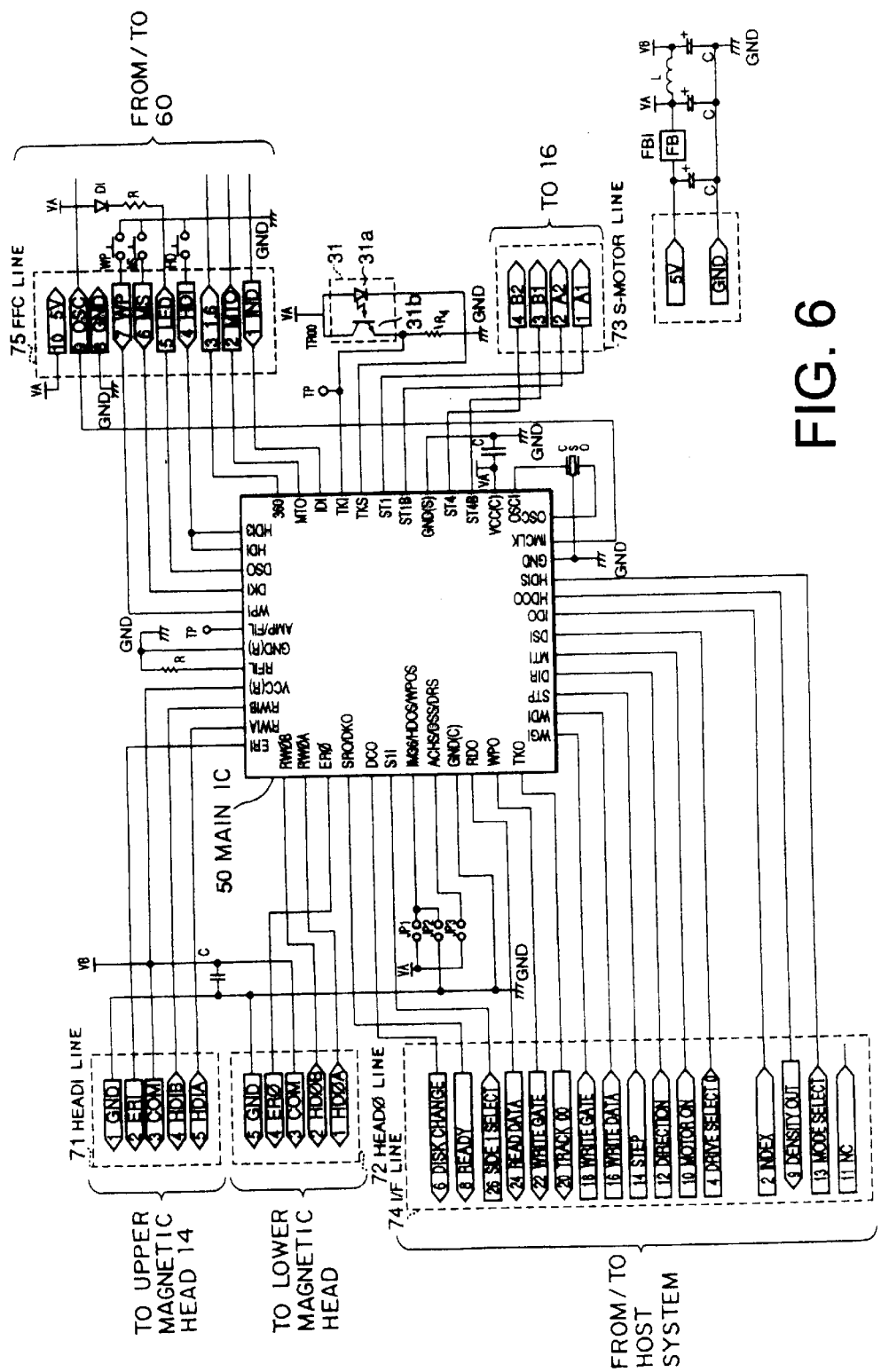
FIG. 6 is a plan view showing an external appearance of main IC of FDD control apparatus for controlling FDD.
Figure 7:
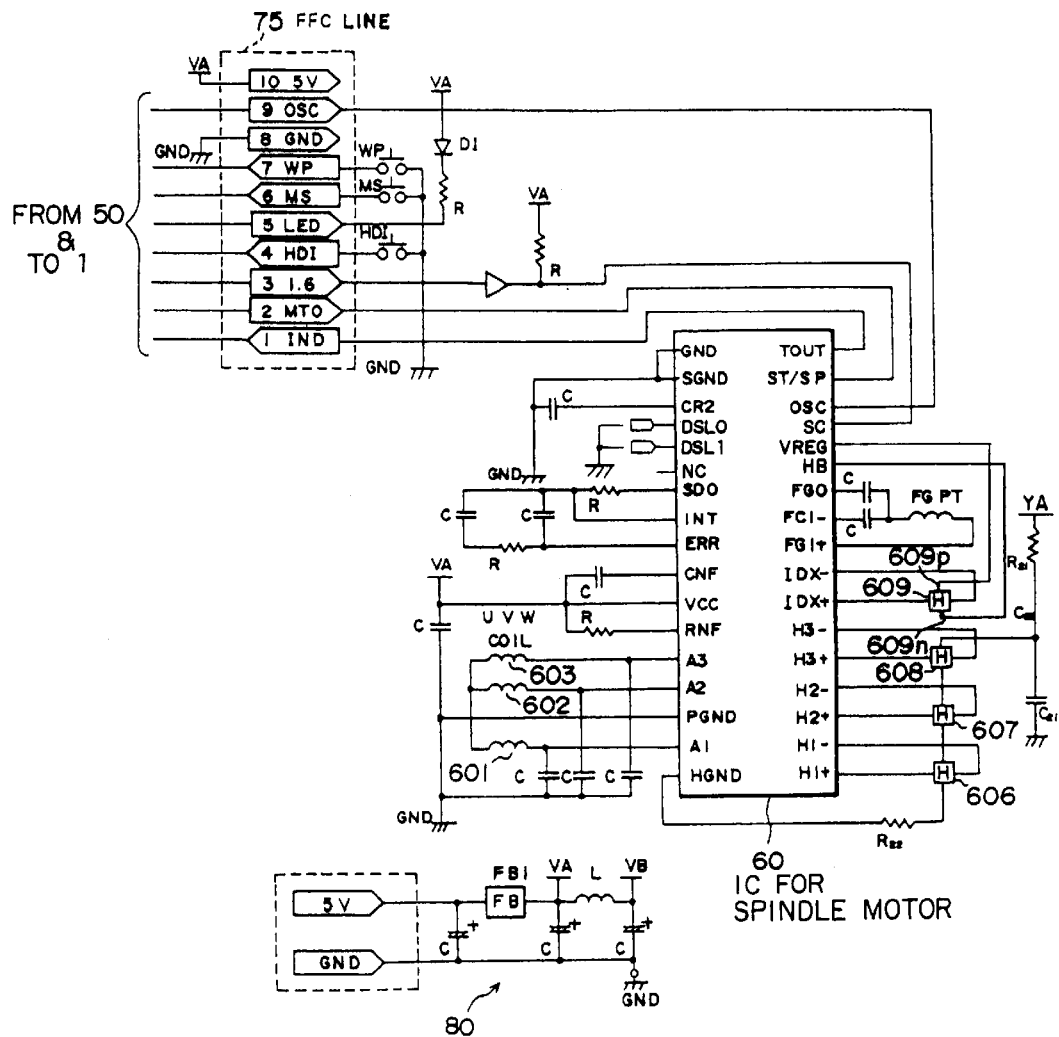
FIG. 7 is plan view showing an external appearance of IC for spindle motor, the IC being used together with the main IC illustrated in FIG. 6.

Referring to FIGS. 6 and 7, FDD control apparatus comprises the main integrated circuit (IC) 50, the IC 60 for spindle motor, and the power supply circuit 80. The main IC 50, the IC 60 for spindle motor, and the power supply circuit 80 are mounted on the main printed substrate. The IC 60 for spindle motor is an IC chip for controlling drive of the spindle motor and is implemented as a bipolar IC in which many bipolar transistors are integrated. The main IC 50 is implemented as a MOS IC in which a large number of MOS field effect transistors (FETs) are integrated. The power supply circuit 80 is a circuit for supplying a voltage of 5 V when a power switch is turned on, and has a first power supply terminal (VA) and a second power supply terminal (VB).

Figure 8:
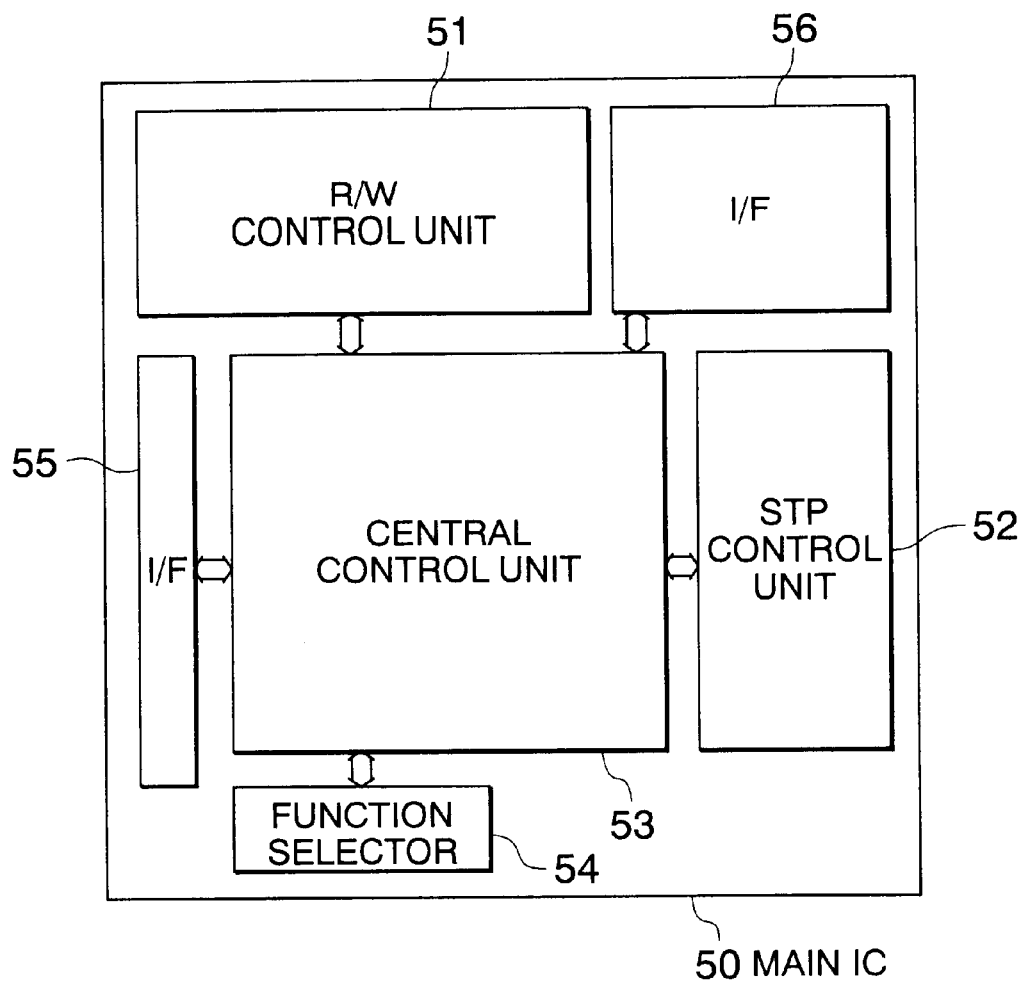
FIG. 8 is a block diagram showing a schematic structure of the main IC illustrated in FIG. 6.

Referring to FIG. 8 in addition to FIG. 6, the main IC 50 comprises the R/W control unit 51, the STP control unit 52, the central control unit 53, the function selector 54, first I/F unit 55 and second I/F unit 56. The R/W control unit controls to read data out of FD and to write data in FD. The STP control unit controls to drive the stepping motor. The central control unit 53 controls the overall operations in the FDD, the unit 53 being also called a logic circuit. The function selector 54 receives the user requests to select functions implemented in the main IC 50. The first I/F unit 55 is the I/F unit for host system, while the second I/F unit 56 is the I/F unit for the spindle motor.

The R/W control unit 51 is connected to the upper magnetic head 14 and the lower magnetic head through HEAD1 line 71 and HEAD0 line 72, respectively. The STP control unit 52 is connected to the stepping motor through an S-MOTOR line 73. The first I/F unit 55 is connected to a host system through I/F line 74, while second I/F unit 56 is connected to the IC 60 for spindle motor through FFC line 75.

Next, the description will be made about input/output terminals of the main IC 50. The main IC 50 has R/W output terminals (ER1, RW1A, RW1B, ER0, RW0A, RW0B, VCC (R)), which are connected to the HEAD1 line 71 and the HEAD0 line 72. The main IC 50 has STP output terminals (ST1, ST1B, ST4, ST4B), which are connected to the S-MOTOR line 73. The main IC 50 has host input/output terminals (DC0, S1I, RD0, WP0, TK0, WGI, WDI, STP, DIR, MTI, DSI, ID0, HDO0, HDIS), which are connected to the I/F line 74. The main IC 50 has spindle motor controlling input/output terminals (IDI, MTO, 360, HDI3, HDI, DSO, DKI, WPI, 1MCLK), which are connected to the FFC line 75.

In addition, the main IC 50 has two input terminals for selecting functions (1M36/ HDOS/WPOS, ACHS/DSS/DRS), three input terminals for the 00 sensor (AMP/FIL, TKI, TKS), and so on.

The photo-interrupter 31 comprises the light emitting diode (LED) 31a and the photo transistor 31b, and serves as the 00 sensor, where the light emitting diode (LED) 31a acting as the light-emitting element and the photo transistor 31b acting as the light-receiving element. The light emitting diode 31a has the anode connected to the first power supply terminal VA (VCC) and the cathode connected to the TKS terminal of the main IC 50. The collector terminal of the photo transistor 31b is connected to the first power supply terminal VA (Vcc), while the emitter terminal of the photo transistor 31b is grounded through the resistor $R_4$ and is connected to the TKI terminal and the AMP/FIL terminal of the main IC 50.

Turning to FIG. 7, the spindle motor controlled by the IC 60 for spindle motor is a brushless three-phase D.C. motor, which has three-phase coils (stator windings) 601, 602, and 603 of U-phase, V-phase, and W-phase. The spindle motor comprises a permanent magnet type rotor and a rotor position detector for detecting the position of the rotor to produce rotor position detection signals. The IC 60 for spindle motor includes therein a driving transistor (a transistor rectifier), which consists of a plurality of bipolar transistors. Responsive to the rotor position of the spindle motor, the bipolar transistors turn on to flow electric current in the respective stator windings, so that the spindle motor generates torque between magnetic poles of the rotor and the stator windings, and thereby, rotates the rotor. According to the rotation of the rotor 310, the rotor position detection signals produced by the rotor position detector are changed. As the result, electric current flows in the stator windings in turn so that the rotation of the rotor is kept.

The spindle motor comprises the frequency generation pattern FGPT which is helpful to detect the rotation speed of the rotor. When the rotation speed of the rotor is detected by using the frequency generation pattern FGPT, the IC 60 for spindle motor changes the stator windings into which the electric currents flow, referring also to the rotor position detection signals produced by the rotor position detector.

As shown in FIG. 7, three Hall elements 606, 607, and 608 are used as the above-mentioned rotor position detector. See, for example, U.S. Pat. No. 4,882,511 issued to Johann von der Heide as regards detailed relationship for arrangement of the three Hall elements 606 through 608. The three Hall elements 606 through 608 are arranged at intervals of an electric angle of 120 degrees.

The other Hall element 609 is used for detection of an index. The Hall element 609 corresponds to the Hall element 3 shown in FIG. 1. The anode 609p of the Hall element 609 is supplied with the reference voltage (VREG), while the cathode 609n of the Hall element 609 is supplied with the Hall bias voltage (HB). The Hall element 609 provides the IC 60 with two Hall voltages of the positive (IDX+) and the negative (IDX−). The IC 60 comprises the index detector 6, the clock 7, and the delay counter 8, all of which are described in the embodiment. Thus IC 60 generates an index signal to input it into the IC 50 through the terminal $T_{OUT}$. Each of the terminals DSL0 and DSL1 is opened or shorted so that the delay time of the delay counter 8 is selected.

Figure 9:
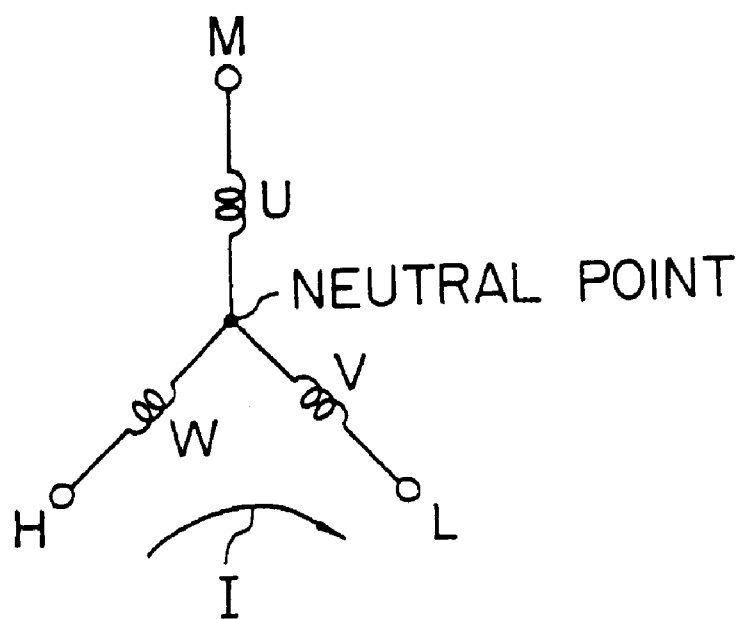
FIG. 9 is a view showing a state of an electric current flowing three-phase coils.

As shown in FIG. 9, the three-phase coils 601, 602, and 603 of U-phase, V-phase, and W-phase are connected to each other at a neutral point or a common connection terminal. The connection is called as star connection or Y-connection. The three coils 601, 602, and 603 of U-phase, V-phase, and W-phase are hereinafter called a U-phase coil, a V-phase coil, and a W-phase coil, respectively. In FIG. 9, the coil, which the electric current (I) flows into, is depicted with the reference letter "H," while the coil, which the electric current (I) flows out of, is depicted with "L". In the illustrated example, electric current (I) flows into the W-phase coil 603 and flows out of the V-phase coil 602. The coil depicted with the reference letter "H" is called a source coil, while the coil depicted with the reference letter "L" is called a sink coil. In the illustrated example, the W-phase coil is the source coil, while the V-phase coil is the sink coil. In addition, a state of the coil, which the electric current (I) neither flows in nor flows out, is called a high-impedance state, and the coil is depicted with the reference letter "M". In the illustrated example, the U-phase coil 601 is put into the high-impedance state or "M" state.

As described above, among the three-phase coils 601, 602 and 603, one of coils is put into the "H" state, another one is put into the "L" state, and the remaining one is put into the "M" state. There are six ways to flow the electric current (I) into the three-phase coils 601, 602 and 603.

The rotor of the DD motor comprises the ring-shaped permanent magnet which is repeatedly magnetized in a circumferential direction. The ring-shaped permanent magnet is equivalent to the plurality of magnetic elements which are arranged at equal interval to form the ring. The stator comprises the plurality of stator cores or stator poles, where coils are wound. Provided that the number of the magnetic elements and the number of the poles of the stator are represented by M and N, respectively, a radio M:N is equal to 4:3 in this example.

If the number of the magnetic elements of the rotor is twenty, the number of the poles of stator is fifteen. The twenty of magnetic elements of the rotor are arranged in the circumferential direction at an angular distance of 18 degrees. The fifteen of poles of the stator are arranged in the circumferential direction at an angular distance of 24 degrees. In this case, the U-phase coil 601 has five stator coils. Similarly, each of the V-phase coil 602 and the W-phase coil 603 has five stator coils. Arranged at the electric angle of 120 degrees, the three Hall elements 606 through 608 detect magnetic fields of the magnetic elements in the rotor and produce three detection signals. Supplied with the three detection signals as three input conditions, the IC 60 for spindle motor switches the three-phase coils 601, 602, and 603 of U-phase, V-phase, and W-phase to flow electric current (I) to the switched phase coils.

Figure 10:
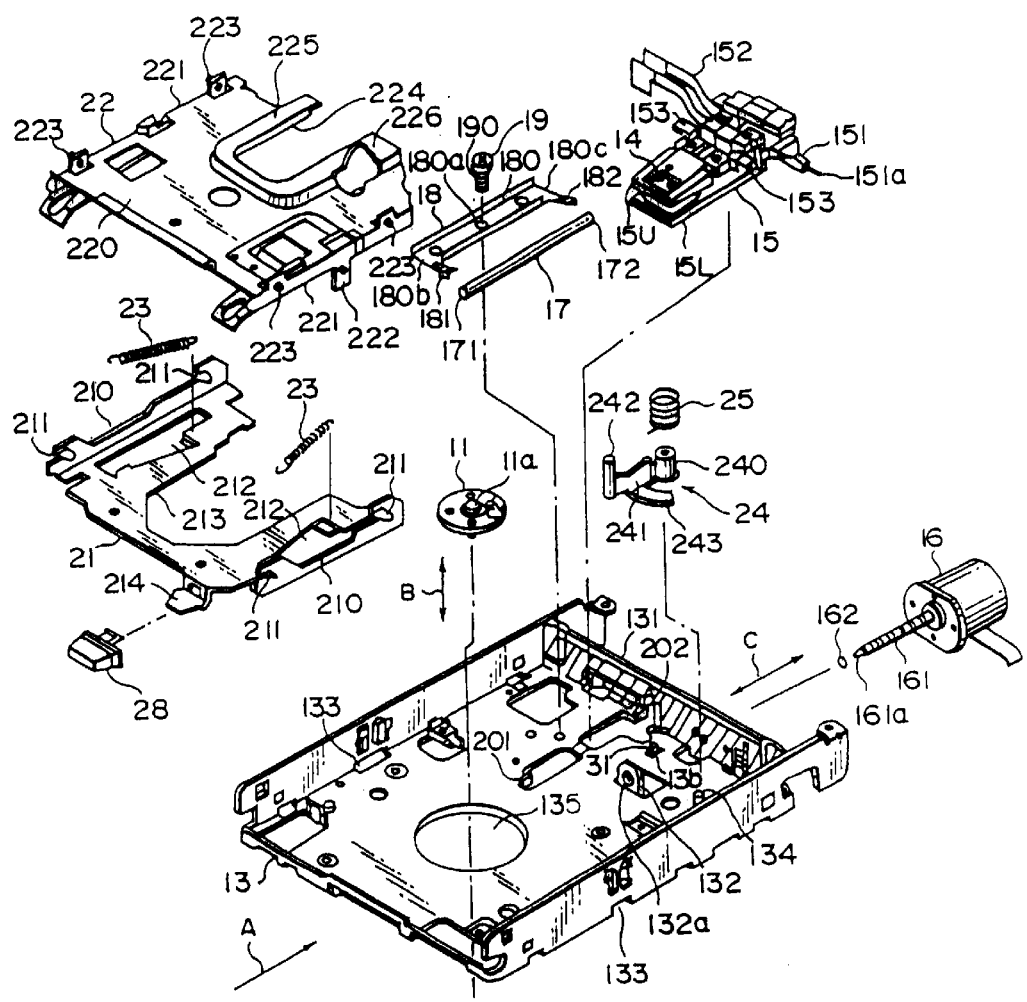
FIG. 10 is an exploded perspective view showing a main part of FDD.
Figure 11:
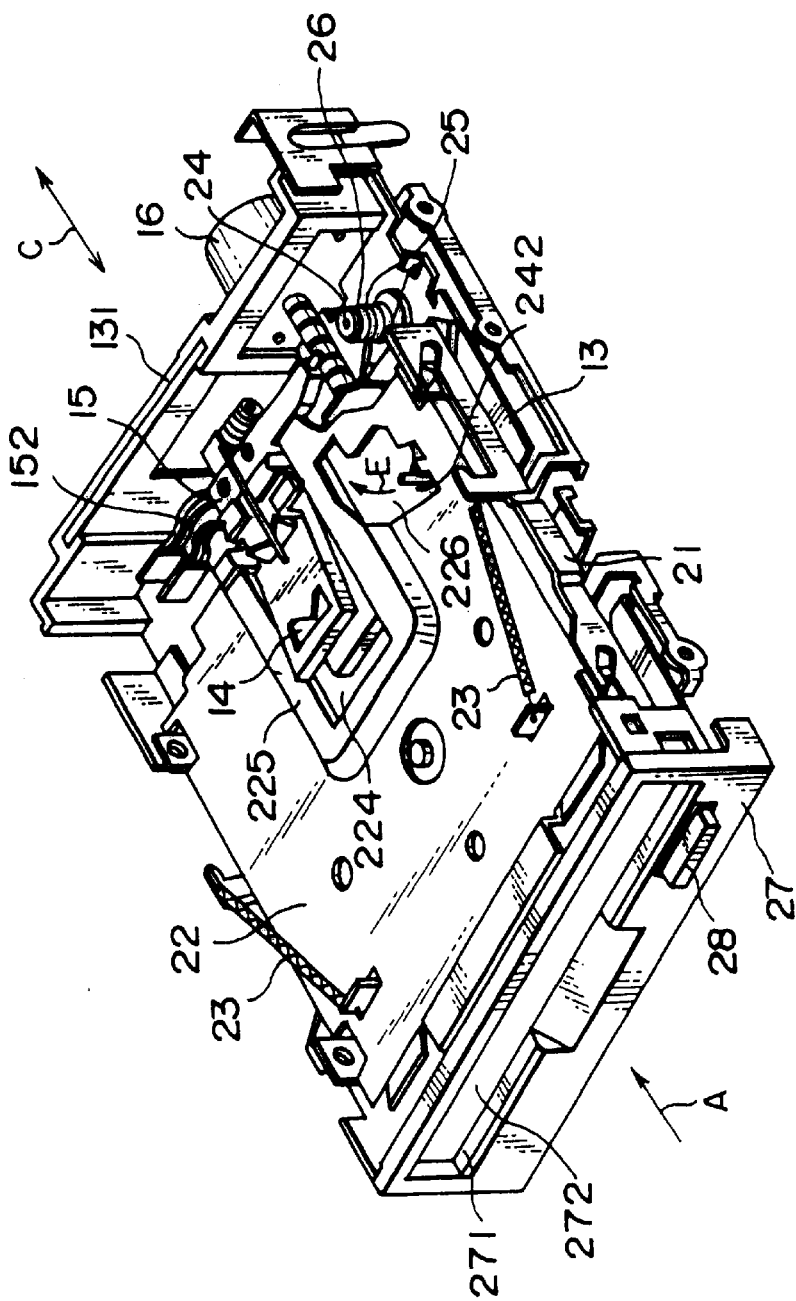
FIG. 11 is a schematic perspective view of the FDD illustrated in FIG. 10 as view from front obliquely.

Referring to FIGS. 10 and 11, FDD of 3.5-inch type will be described herein. FIG. 10 is an exploded perspective view of the FDD, and FIG. 11 is a perspective view of the FDD viewing from a front side.

The illustrated FDD is a device for driving FD of 3.5-inch type. An FD is loaded in the FDD along the direction depicted as the arrows A in FIGS. 10 and 11. The loaded FD is held on the disk table 11 having the rotation axis 11a. In this case, the rotation axis 11a coincides with the center axis of the held FD. As described later, the disk table 11 is supported on the main surface of the main frame 13 so as to rotate around the rotation axis 11a. The axial direction B of the rotation axis 11a of the disk table 11 is therefore in parallel with the thick direction of the main frame 13. The disk table 11 is rotated by the direct-drive (DD) motor mounted on the back surface of the main frame 13, so that the magnetic recordable medium of the FD also rotates. On the back surface of the main frame 13, a main printed substrate mounting a number of electronic parts is also fixed.

The FDD comprises a pair of upper and lower magnetic heads 14 (only the upper magnetic head is illustrated), both of which are for reading data out of the magnetic recordable medium of the FD and for writing data into the magnetic recordable medium of the FD. The magnetic heads 14 are supported on the tip of the carriage assembly 15 that is arranged on the rear side of the FDD. That is, the carriage assembly 15 comprises the upper carriage 15U for supporting the upper magnetic head 14 and the lower carriage 15L for supporting the lower magnetic head. The carriage assembly 15 is disposed above the main surface of the main frame 13 with a certain distance being between the carriage assembly 15 and the main surface, that disposal being described later. The carriage assembly 15 supports the magnetic heads 14 so that the magnetic heads can move along the radial direction (i.e. a direction indicated by an arrow C in FIGS. 10 and 11) of the FD.

The main frame 13 has the side wall 131 at the rear side of the main frame 13. On the side wall 131, the stepping motor 16 is fixed. The stepping motor 16 drives the carriage assembly 15 to linearly move the carriage assembly 15 along the predetermined radial direction C. In detail, the stepping motor 16 has the driving shaft 161 which serves as the rotation axis of the stepping motor. The driving shaft 161 extends in parallel with the predetermined radial direction C and is threaded to form a male screw. The bent piece 132 is raised up from the main surface of the main frame 13 by the cutting and bending process. The driving shaft 161 is holds within the hole 132a bored in the bent piece 132 so that the tip 161a of the driving shaft 161 is located closer to the front end of the FDD than the bent piece 132. The tip 161a of the driving shaft 161 is provided with the steel ball 162. The hole 132a and the steel ball 152 make the driving shaft 161 extend in parallel with the predetermined radial direction C so that the tip 161a is rotatably held.

The carriage assembly 15 comprises the arm 151 which extends from the lower carriage 15L to the driving shaft 161. The leading edge 151a of the arm 151 is bent so as to engage with the groove of the male screw of the driving shaft 161. With the structure, the rotation of the driving shaft 161 of the stepping motor 16 moves the leading edge 151a of the arm 151 along the groove of the male screw of the driving shaft 161, so that the carriage assembly 15 is moved along the predetermined radial direction C. Thus, the stepping motor 16 serves as a driving arrangement for moving the carriage assembly 15 along the predetermined radial direction C.

The driving shaft 161 of the stepping motor 16 is disposed at one side of the carriage assembly 15, so that the one side of the carriage assembly 15 is movably supported by the driving shaft 161 and is apart from the main surface of the main frame 13. However, by only the use of the driving shaft 161, it is difficult to dispose the whole of the carriage assembly 15 apart from the main surface of the frame 13. For such disposal, it is necessary to support and guide the carriage assembly 15 at the other side of the carriage assembly 15. To guide and support the other side of the carriage assembly 15, the guide bar 17 is used. The guide bar 17 is arranged opposite to the driving shaft 161 of the stepping motor 16 so that the carriage assembly 15 is located between the guide bar 17 and the driving shaft 161. The guide bar 17 extends in parallel with the predetermined radial direction C. The both ends 171 and 172 of the guide bar 17 are mounted on the main surface of the main frame 13, as described later. The guide bar 17 guides the carriage assembly 15 along the predetermined radial direction C. The support of the guide bar 17 results in that the whole of the carriage assembly 15 is disposed apart from the main surface of the main frame 13.

The flexible printed circuit (FPC) 152 extends from the carriage assembly 15 to the vicinity of the guide bar 17 and is electrically connected to the main printed substrate attached to the back surface of the main frame 13.

The guide bar 17 is clamped on the main surface of the main frame 13 by the guide bar clamp 18. The guide bar clamp 18 is fixed on the main surface of the main frame 13 by the binding small screw 19. More specifically, the guide bar clamp 18 comprises the fixing member 180 of the rectangular shape. The long side of the rectangular shape is slightly longer than the length of the guide bar 17. The fixing member 180 has the hole 180a which is formed by drilling at the center of the rectangular shape of the fixing member 180. The screw shaft 190 of the binding small screw 19 is fixed into the hole 180a. Arms 181 and 182 extend from both ends 180b and 180c of the fixing member 180, to clamp the ends 171 and 172 of the guide bar 17.

The guide bar clamp 18 merely clamps the guide bar 17 and can not fixed the guide bar 17 on the main surface of the main frame 13 without the help of other members. To give the help to locate the both ends 171 and 172 of the guide bar 17, a pair of locating members are provided. In the concrete example, the pair of locating members comprises the pair of bent pieces 201 and 202 which are formed by giving the cutting and bending process to parts of the main frame 13. The pair of bent pieces 201 and 202 locates both ends 171 and 172 of the guide bar 17 to fix the guide bar 17 on the main surface of the main frame 13 in cooperation with the guide bar clamp 18.

The lower carriage 15L of the carriage assembly 15 also serves as a supporting frame for supporting the carriage assembly 15. The carriage assembly 15 can slide along the guide bar 17 with the support of the lower carriage 15L. The lower carriage 15L has a projecting portion which projects from the lower carriage 15L toward the guide bar 17. The guide bar 17 is slidably fitted into the projecting portion.

The FDD further comprises the eject plate 21 and the disk holder 22. A metal plate is bent and pressed so that the main frame 13, the eject plate 21, and the disk holder 22 are formed.

The eject plate 21 is mounted on the main surface of the main frame 13 and can slide along the insertion direction A of the FD and an opposite direction. As will be described later, the eject plate 21 holds, in cooperation with the disk holder 22, the FD when the FDD works. Under the hold of the FD by the eject plate 21, the FDD can load the FD into the FDD along the insertion direction A and can eject the FD from the FDD along the opposite direction. The eject plate 21 comprises the pair of side walls 210 which are opposed to each other. Each of the side walls 210 has the pair of cam portions 211. On the bottom surface of the eject plate 21, cut portions 212 are formed along the both side walls 210. On the center of the bottom surface of the eject plate 21, the U-shaped cut portion 213 is formed to surround a part of the disk table 11. On the back surface of the eject plate 21, a pin is formed to engage with a stop part of an eject lever, as will be described later.

The disk holder 22 is arranged on the eject plate 21. The disk holder 22 comprises the principal surface 220 and the pair of side walls 221. The side walls 221 are formed at both side ends of the principal surface 220 and are opposite to each other. The both side walls 221 have the projection pieces 222 (only one is illustrated). The projection pieces 222 are inserted into the bores 133 of the main frame 13 through the cut portions 212 of the eject plate 21. The insertion of the projection pieces 222 decides the position of the disk holder 22 for the main frame 13 in the insertion direction A, so that the disk holder 22 is reciprocated in the axial direction B of the rotation axis 11a of the disk table 11. Each of the both side walls 221 has the pair of pins 223. The pins 223 are inserted into the cam portions 211 that is formed on the side walls 210 of the eject plate 21. Between the disk holder 22 and the eject plate 21, eject springs 23 bridge.

In this example, the disk holder 22 is provided with the projection pieces 22 and the bores 133 are formed in the main frame 13, as mentioned above. However, the present invention does not restricted to the example. For example, the main frame 13 may be provided with projection pieces and bores may be formed in the disk holder 22.

With the middle position at the back side of the disk holder 22 in the insertion direction A, the opening section 224 of the rectangular shape is provided. The opening section 224 extends in the predetermined radial direction C, and is disposed at the position corresponding to the upper carriage 15U of the carriage assembly 15. The U-shaped swelled portion 225, which is swelled up on the principal surface 220 of the disk holder, is formed to surround three sides of the opening section 224. The carriage assembly 15 comprises the pair of side arms 153 which extends in the lateral direction perpendicular to the longitudinal direction of the carriage assembly 15. The side arms 153 are located on or above the swelled portion 225. As will be described later, under the condition that the FD is ejected from the disk holder 22, the side arms 153 engages with the swelled portion 225, so that the pair of upper and lower magnetic heads 14 are apart from each other. The disk holder 22 has the additional opening section 226 at the right-hand side of the opening section 224 in the back side of the insertion direction A. The opening section 226 has a particular shape to allow the lever part of the eject lever to move rotatably.

At the vicinity of the carriage assembly 15 on the main frame 13, the eject lever 24 is arranged to rotatably move. More specifically, the rod pin 134 stands up on the main frame 13, upwardly extending from the main surface of the main frame 13. The eject lever 24 comprises the cylindrical part 240, the arm part (the lever part 241), the projection part 242 and the arc-shaped stop part 243. Into the cylindrical part 240, the rod pin 134 is inserted. The arm part 241 extends from the cylindrical part 240 in the radial direction of the cylindrical part 240. The projection part 242 is formed at the free end of the arm part 241 and extends upwards. The arc-shaped stop part 243 extends from the side of the free end of the arm part 241 in the circumferential direction of the cylindrical part 240. In the eject lever 24, the eject lever spring 25 is arranged to surround the cylindrical part 240, and urges the eject lever 24 in the counterclockwise direction on the paper of FIG. 10. The projection part 242 of the eject lever 24 is freely fitted in the opening section 226 of the disk holder 22. The projection part 242 is engaged with the upper end of the right-hand side edge of the shutter in the FD, so as to control opening and shutting of the shutter. As shown in FIG. 11, the screw 26 is thrust into the tip of the rod pin 134, to prevent the eject lever 24 from falling off the rod pin 134.

On the front end section of the main frame 13, the front panel 27 is disposed. The front panel 27 has the opening 271 and the door 272. FDD can accommodate FD through the opening 271 and can eject FD from the opening 271. The door 272 serves to open and to shut the opening 271. The eject button 28 is arranged on the front panel 27 to move backward and forward. The eject button 28 is fitted in the protrusion part 214 which forwardly protrudes from the front end of the eject plate 21.

Figure 12:
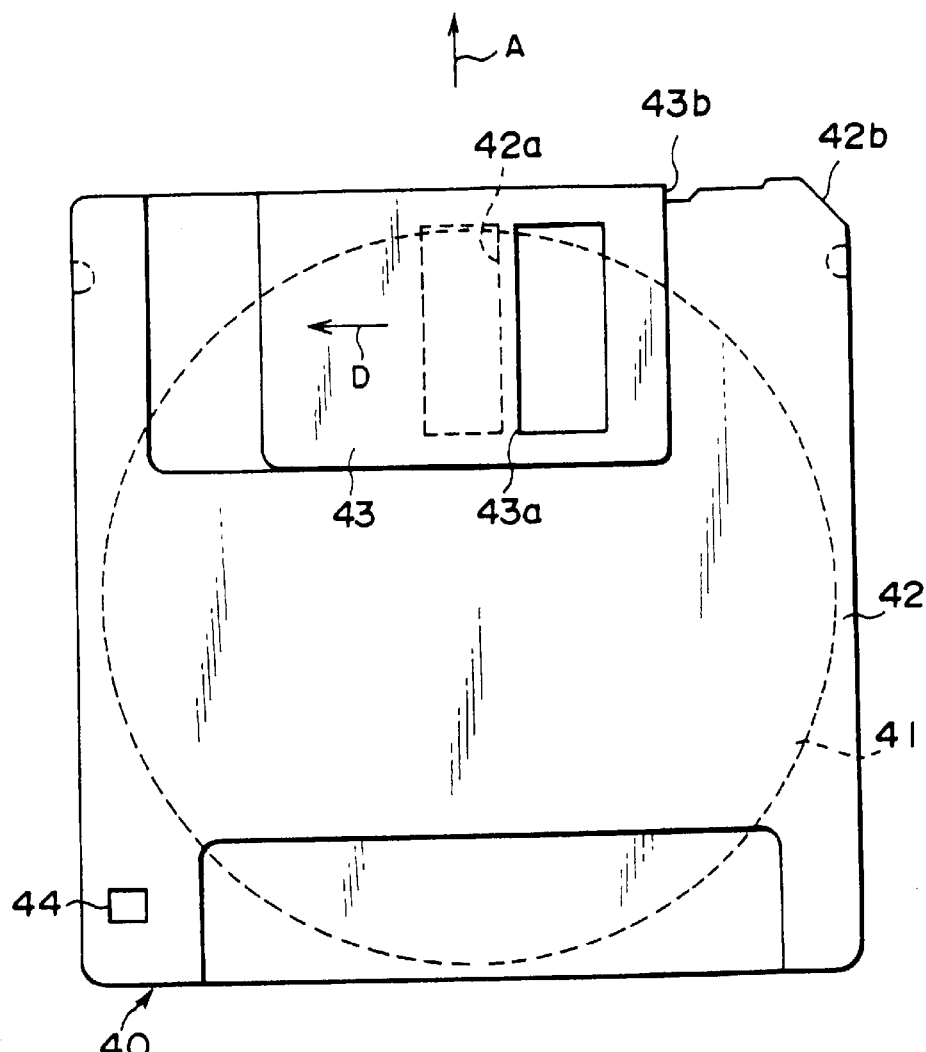
FIG. 12 is a plan view showing FD driven by the FDD.

Referring to FIG. 12, the description will proceed to the FD driven by the FDD illustrated in FIGS. 10 and 11. The illustrated FD 40 comprises the magnetic recordable medium 41 of the disk-shaped, the shell 42 for covering or for receiving the magnetic recordable medium 41, and the shutter 43. The shutter 43 is provided with the shutter window 43a, and can slide in the direction depicted by the arrow D in FIG. 12. The shutter 43 is urged by the spring member (not shown) in the direction opposite to the direction D. The shell 42 is provided with the head window 42a, which enables the magnetic heads 14 (FIGS. 10 and 11) of the FDD to access the magnetic recordable medium 41.

When the FD 40 is not loaded in the FDD, the head window 43a is covered by the shutter 43 as shown in FIG. 12. When the FD 40 is loaded in the FDD, the projection part 242 of the eject lever 42 engages with the upper end 43b of the right-hand side edge of the shutter 43 and slides the shutter 43 in the direction D.

The shell 42 has the chamfered portion 42b at the corner of the upper-right side of the shell 42. The chamfered portion 42b is for preventing reverse insertion (wrong insertion in a vertical direction or the insertion direction A). The write protection hole 44 is bored in the shell 42 at the corner of the rear- left side in the insertion direction A of FIG. 12.

As described above, in the FD 40 driven by the FDD, the magnetic recordable medium 41 accessed by the magnetic heads 14 has the plurality of tracks on the surface of the magnetic recordable medium 41. The tracks serves as paths for recording data, and are formed in concentric circles and are arranged along the radial direction of the magnetic recordable medium 41. One side of the FD 40, there are eighty tracks which include the most outer circumference track (the most end track) TR00 and the most inner circumference track TR79.

Figure 13:
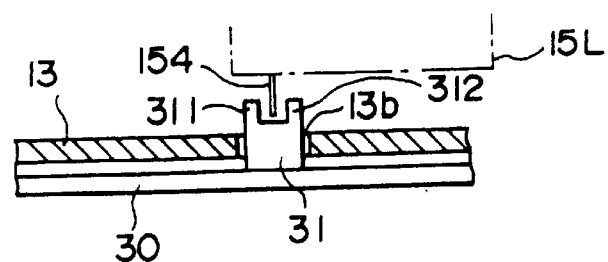
FIG. 13 is a sectional view for use in describing a set-up structure of a track position detecting mechanism (00 sensor) used in the FDD.

Referring to FIG. 13 in addition to FIG. 10, the description will proceed to a track position detecting mechanism (also called as "a 00 sensor") for detecting the position of the most end track TR00 of the magnetic recordable medium 41.

The lower carriage 15L of the carriage assembly 15 is provided with the interception plate 154 which downwardly projects from the bottom of the lower carriage 15L. The main printed substrate 30 is disposed on the back surface of the main frame 13 opposite to the carriage assembly 15. On the main printed substrate 30, the photo-interrupter 31 is mounted. The photo-interrupter 31 is used as the track position detecting mechanism (the 00 sensor). For the mounting of the photo-interrupter 31, the main frame 13 has the bore 13b into which the photo-interrupter 31 is inserted.

The photo-interrupter 31 comprises the first protrusion section 311 and the second protrusion section 312. Into the first protrusion section 311, a light-emitting element is installed. Into the second protrusion section 312, a light-receiving element is built. The first protrusion section 311 and the second protrusion section 312 are opposite to each other, as shown in FIG. 13. On the walls facing to the first and second protrusion sections 311 and 312, two opening sections (not shown) are provided, respectively. Through the two opening sections, an optical path is formed between the light-emitting element and the light-receiving element. The above-mentioned interception plate 154 can traverse between the first protrusion section 311 and the second protrusion section 312. The traverse of the interception plate 154 intercepts the optical path.

In the 00 sensor with such a structure, when the interception plate 154 intercepts the optical path in the photo-interrupter 31, it is detected that the magnetic heads 14 (FIGS. 10 and 11) are positioned above the most end track TR00 on the magnetic recordable medium 41 of the flexible disk 40.

Figure 14:
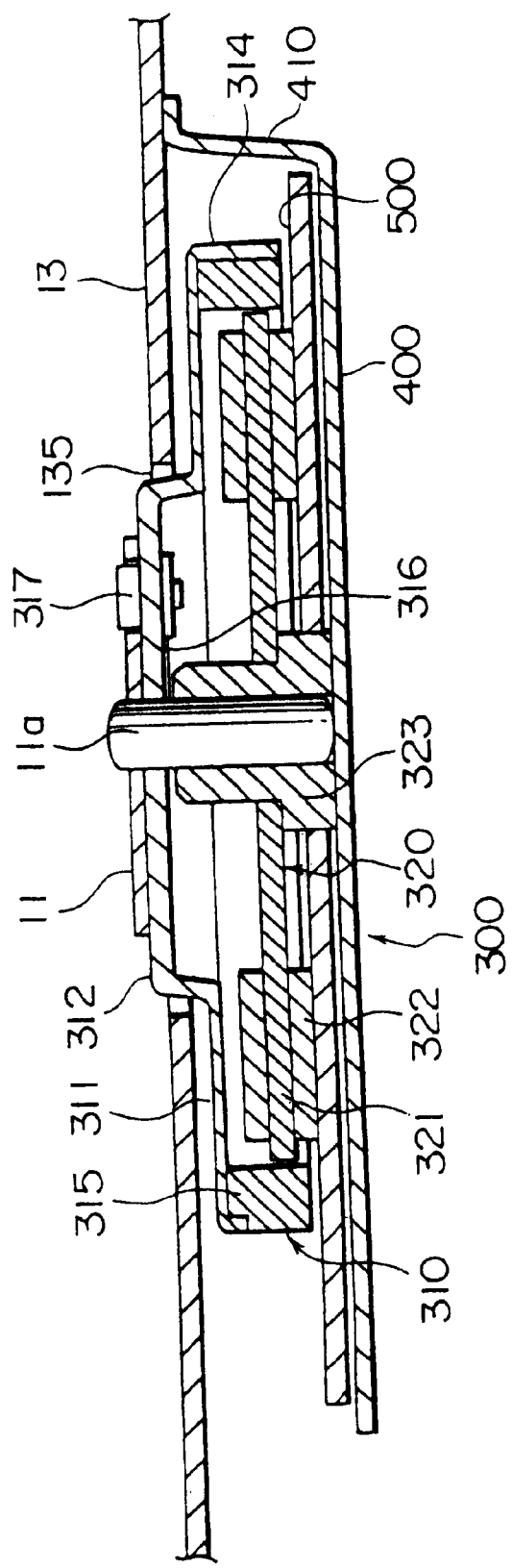
FIG. 14 is a sectional view showing a relationship between a main frame and a DD motor (spindle motor) mounted thereon in the floppy disk drive illustrated in FIG. 10.

Referring now to FIG. 14, the description will proceed to the spindle motor (DD motor) for use in the above-mentioned FDD.

The illustrated DD motor 300 comprises the rotor 310 and the stator 320 combined with the rotor 310. The rotor 310 comprises the disk-shaped metallic casing 311. The metallic casing 311 has the protruding portion 312 that is formed at the center of the metallic casing 311 and that protrudes upwardly. On the upper surface of the protruding portion 312, the above-mentioned disk table 11 is mounted. The main frame 13 has the circular opening 135. The circular opening 135 allows only the upper part of the protruding portion 312 to pass through the opening 135 and to project above the main surface of the main frame 13. As a result, the disk table 11 is located above the main surface of the main frame 13.

The rotor 310 is provided with the rotation axis or shaft 11a. In detail, the rotation shaft 11a is made of metal and is fixed at the center of the rotor 310 so as to pierce the casing 311 and the disk table 11. The casing 311 and the rotation shaft 11a are integrally assembled when the disk table 11 is formed by plastic magnet in the injection-molded process. The casing 311 has the cylindrical member 314 which is formed on the outer peripheral edge of the casing 311 to downwardly extend from the outer peripheral edge. The ring-shaped permanent magnet 315 is arranged inside of the cylindrical member 314.

As mentioned above, the ring-shaped permanent magnet 315 is obtained by repeatedly magnetizing to arrange the plurality of magnetic elements along the circumferential direction of the ring-shape. The bottom portion of the permanent magnet 315 has the plurality of motor-servo magnetic elements along the circumferential direction of the bottom portion. If the stator 320 has fifteen poles, the magnetic elements are twenty. That is, the number of the negative poles (or north poles) N is ten, and also the number of the positive poles (or south poles) S is ten. The motor-servo magnetic elements are equal to one hundred twenty. That is, the number of the negative poles N is sixty, and also the number of the positive poles S is sixty. The number of the motor-servo magnetic elements can be determined independently of the number of the poles of the stator 320. The magnetic elements of the ring-shaped permanent magnet 315 are called magnetized portions for driving, while the motor-servo magnetic elements are called magnetized portions for detection.

As shown in FIG. 14, the cylindrical member 314 has a cut portion through which a part (340) of the magnetic elements of the ring-shaped permanent magnet 315 is exposed as the magnetic poles. The exposed magnetic poles serve as the permanent magnet 2 illustrated in FIG. 1. That is, the number of the exposed magnetic poles is two, and the exposed magnetic poles are used for the index detection.

On the lower surface of the protruding portion 312, the arm 316 is set. On the arm 316, the drive roller 317 is rotatably mounted. The protruding portion 312 and the disk table 11 have holes which are substantially formed in the rectangular. Through these holes, the drive roller 317 upwardly projects from the disk table 11. The FD 40 received in the FDD is placed on the disk table 11. The drive roller 317 is engaged with a hole formed in a hub of the FD 40. Thus, the magnetic disk medium 41 is rotated together with the rotation of the rotor 310.

The stator 320 is arranged to the back surface of the main frame 13 by means of the motor frame 400 which is for example made of metal. More specifically, the stator 320 is formed on the printed wiring board 500 which is mounted on the principal surface of the metallic motor frame 400. The stator 320 comprises a core assembly having a plurality of stator cores 321, a plurality of stator coils 322, and a center metal (bearing unit) 323. Each of the stator core 321 radially extends from the outer periphery of the ring-shaped member of the center metal 323. Each of stator coils 322 is wound around one end portion of each corresponding stator core 321. The center metal 323 is formed at the center of the printed wiring board 500 and rotatably supports the rotation shaft 11a. The motor frame 400 has a plurality of attaching elements 410. The attaching elements 410 are in the inverted-L shape, and upwardly extend from the peripheral edge of the motor frame 400 to abut on the back surface of the main frame 13.

Figure 15:
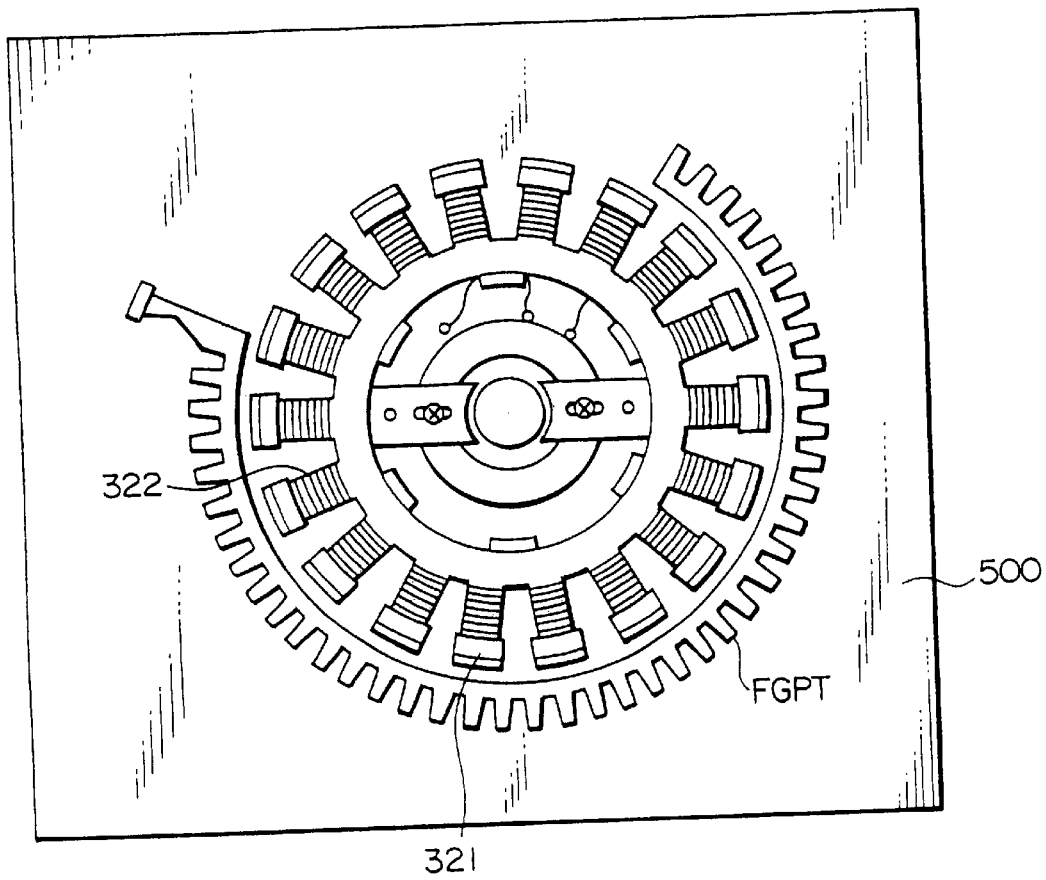
FIG. 15 is a plan view for use in describing a structure of a stator in the DD motor illustrated in FIG. 14.

As shown in FIG. 15, the frequency generation pattern FGPT is formed around the stator 320 of the DD motor 300 on the printed wiring board 500. In other words, the frequency generation pattern FGPT is arranged to oppose to the motor-servo magnetic elements (magnetized portions for detection) of the permanent magnet 315 with the predetermined distance left between the FGPT and the motor-servo magnetic elements. FIG. 15 shows the condition that the stator 320 has eighteen poles. That is, the stator cores 321 (or the stator coils 322) of the stator 320 are eighteen. In this case, the rotor 310 has twenty-four of the magnetic elements of the ring-shaped permanent magnet 315. If the stator 320 has fifteen poles, the rotor 310 has twenty of the magnetic elements.

When the motor-servo magnetic elements of the permanent magnet 315 rotate over the frequency generation pattern FGPT, reverse electromotive force occurs at the frequency generation pattern FGPT Since the motor-servo magnetic elements of the permanent magnet 315 are one hundred twenty, the frequency generation pattern FGPT generates a signal of sixty cycles when the DD motor 300 makes one rotation. This signal is called an FG servo signal. When the number of revolutions of the DD motor 300 is equal to 300 RPM, the DD motor 300 makes five rotations per second. In this case, the FG servo signal has a frequency of (60×5) or 300 Hz.

Accordingly, the rotation speed of the DD motor 300 can be controlled by comparing the FG servo signal with the divided clock signal having the divided clock frequency of 300 Hz. The divided clock signal is obtained by frequency dividing of the reference clock signal having the reference clock frequency of 1 MHz. For example, the frequency dividing uses a counter. In other words, the speed control of the DD motor 300 is carried out by starting the counter in correspondence with the timing of the leading edge of the FG servo signal and by comparing the timing of the trailing edge of the FG servo signal with the timing of the trailing edge of the divided clock signal. More specifically, if the timing of the trailing edge of the FG serve signal is earlier than the timing of the trailing edge of the divided clock signal, the DD motor 300 is controlled so as to slow down the rotation speed of the DD motor 300. Conversely, if the timing of the trailing edge of the FG serve signal is later than the timing of the trailing edge of the divided clock signal, the DD motor 300 is controlled so as to accelerate the rotation speed of the DD motor 300.

What is claimed is:

1. An index signal generator which generates an index signal for use in controlling a rotation of a rotor included in a direct-drive motor, said index signal generator comprising:
    an original signal generator which generates an original signal for every rotation of the rotor;
    a clock adapted to periodically generate a clock signal;
    a counter value selector having a first predetermined number of terminals and holding a second predetermined number of counter values, each of the first predetermined number of terminals receiving a selection signal having a selection value, the counter values being different from one to another, the counter value selector being adapted to select, as a selected counter value, one among the counter values in response to a combination of the selection values; and
    a counter starting the counting of the clock signals generated by the clock in response to the original signal generated by the original signal generator, the counter stopping the counting of the clock signals generated by the clock and generating the index signal when the clock signals counted by the counter reach the selected counter value in number.

2. An index signal generator as defined by claim 1, wherein each of the selection values is either "High" or "Low".

3. An index signal generator as defined by claim 1, wherein Y is equal to $2^x$, X and Y representing the first predetermined number and the second predetermined number, respectively.

4. An index signal generator as defined by claim 3, wherein the first predetermined number is two and the second predetermined number is four.

5. An index signal generator as defined by claim 3, wherein the first predetermined number is three and the second predetermined number is eight.

6. An index signal generator as defined by claim 1, wherein the counter is a decremental counter having supplied thereto the selected counter value as an initial value and decreases a value of the counter by one every counting the clock signal.

7. An index signal generator as defined by claim 1, the rotor having a disk-shape with a thickness and having a magnet on a peripheral surface of the rotor, wherein the original signal generator comprises:
    a Hall element which detects a magnet passing in front of the Hall element in accordance with a Hall effect, so as to produce a detection signal; and
    a index detector adapted to produce the original signal based on a change of the detection signal.

8. An index signal generator as defined by claim 7, the magnet having positive and negative poles which are arranged along a tangential direction of the disk- shape of the rotor, wherein:
    the detection signal alternates when a pole of the magnet passes in front of the Hall element and changes from one to another between the positive and the negative poles; and
    the index detector monitoring the detection signal and producing the original signal when the detection signal alternates.

* * * * *